US012586349B2

(12) United States Patent
Chen et al.

(10) Patent No.: US 12,586,349 B2
(45) Date of Patent: Mar. 24, 2026

(54) SYSTEMS AND METHODS FOR TRAINING MULTI-CLASS OBJECT CLASSIFICATION MODELS WITH PARTIALLY LABELED TRAINING DATA

(71) Applicant: Google LLC, Mountain View, CA (US)

(72) Inventors: Huizhong Chen, Mountain View, CA (US); Zhichao Lu, Santa Clara, CA (US); Jonathan Zwi Ben-Meshulam, Fort Worth, TX (US)

(73) Assignee: GOOGLE LLC, Mountain View, CA (US)

( * ) Notice: Subject to any disclaimer, the term of this patent is extended or adjusted under 35 U.S.C. 154(b) by 448 days.

(21) Appl. No.: 18/015,301

(22) PCT Filed: Oct. 6, 2020

(86) PCT No.: PCT/US2020/054368
§ 371 (c)(1),
(2) Date: Jan. 9, 2023

(87) PCT Pub. No.: WO2022/075972

PCT Pub. Date: Apr. 14, 2022

(65) Prior Publication Data

US 2023/0274527 A1     Aug. 31, 2023

(51) Int. Cl.
*G06V 10/764* (2022.01)
*G06V 10/776* (2022.01)
(52) U.S. Cl.
CPC .......... *G06V 10/764* (2022.01); *G06V 10/776* (2022.01)

(58) Field of Classification Search
CPC ........................... G06V 10/764; G06V 10/776
See application file for complete search history.

(56) References Cited

U.S. PATENT DOCUMENTS

2019/0385021 A1* 12/2019 Sasaki ................ G06V 10/7747

FOREIGN PATENT DOCUMENTS

CN          110059734          7/2019

OTHER PUBLICATIONS

Machine Translated Chinese Search Report Corresponding to Application No. 2020801045060 on Sep. 23, 2024.
(Continued)

*Primary Examiner* — David Perlman
(74) *Attorney, Agent, or Firm* — DORITY & MANNING P.A.

(57) ABSTRACT

Systems and methods of the present disclosure are directed to a computer-implemented method for training a machine-learned multi-class object classification model with partially labeled training data. The method can include obtaining image data depicting objects and ground truth data comprising a subset of object class annotations respectively associated with a subset of object classes of a plurality of object classes. The method can include processing the image data with the machine-learned multi-class object classification model to obtain object classification data. The method can include evaluating a loss function that evaluates a multi-class classification loss and adjusting one or more parameters of the multi-class object classification model based on the loss function.

14 Claims, 6 Drawing Sheets

(56) References Cited

OTHER PUBLICATIONS

Bucak et al. "Multi-label Learning with Incomplete Class Assignments", Computer Vision and Pattern Recognition (CVPR), 2011 IEEE Conference, Jun. 20, 2011, 8 pages.

Ibrahim et al. "Confidence-based Weighted Loss for Multi-label Classification with Missing Labels", Proceedings of the 2020 International Conference on Multimedia Retrieval (ICMR '20), Apr. 19, 2020, 6 pages.

International Search Report for Application No. PCT/US2020/054368, mailed on Apr. 6, 2021, 2 pages.

Kanehira et al. "Multi-label Ranking from Positive and Unlabeled Data", 2016 IEEE Conference on Computer Vision and Pattern Recognition (CVPR), IEEE, Jun. 27, 2016, 10 pages.

Schultheis et al. "Unbiased Loss Functions for Extreme Classification with Missing Labels", Cornell University Library, arXiv:2007.00237v1, Jul. 1, 2020, 12 pages.

International Preliminary Report on Patentability for Application No. PCT/US2020/054368, mailed Apr. 20, 2023, 11 pages.

Durand et al., "Learning a Deep ConvNet for Multi-label Classification with Partial Labels", Proceedings of the IEEE/CVF conference on Computer Vision and Pattern Recognition, 2019, Long Beach, CA, pp. 647-657.

Ibrahim et al., "Confidence-based Weighted Loss for Multi-label Classification with Missing Labels", Proceedings of the 2020 International Conference on Multimedia Retrieval, Jun. 8-11, 2020, Dublin, IE, 5 pages.

* cited by examiner

500

502 — OBTAIN IMAGE DATA DEPICTING OBJECTS AND GROUND TRUTH DATA COMPRISING OBJECT CLASS ANNOTATIONS

504 — PROCESS THE IMAGE DATA WITH A MACHINE-LEARNED MULTI-CLASS OBJECT CLASSIFICATION MODEL

506 — EVALUATE A LOSS FUNCTION

508 — ADJUST PARAMETERS OF THE MACHINE-LEARNED MULTI-CLASS OBJECT CLASSIFICATION MODEL BASED ON THE LOSS FUNCTION

SYSTEMS AND METHODS FOR TRAINING MULTI-CLASS OBJECT CLASSIFICATION MODELS WITH PARTIALLY LABELED TRAINING DATA

PRIORITY CLAIM

This application is based upon and claims the right of priority under 35 U.S.C. § 371 to International Application No. PCT/US2020/054368 filed on Oct. 6, 2020, which is incorporated by reference herein.

FIELD

The present disclosure relates generally to training machine-learned object classification models. More particularly, the present disclosure relates to training machine-learned multi-class object classification models to detect and recognize multiple classes of objects depicted in image data using partially labeled training data.

BACKGROUND

Training machine-learned multi-class object classification models to detect and recognize multiple classes of objects generally utilizes image training data that is labeled with ground truth labeled bounding boxes for one or more of the multiple classes. This training data is often not completely labelled. That is, an explicit label is not given for every class. Instead, some labels may be implicitly inferred. For example, regions of the image data that are not included in the labeled bounding boxes (e.g., unlabeled) are generally assumed to not include any objects belonging to these classes.

However, these unlabeled regions often include other objects that correspond to object classes the model is trained to detect. As an example, a model may be trained to recognize cats and a training image may include a cat in an unlabeled region. If a label for this unlabeled region is implicitly inferred (e.g., a cat does not exist in the region), the model can be trained incorrectly (e.g., trained to not recognize the presence of the cat).

As such, the generation of training data for object classification models generally requires exhaustive annotation of all classes depicted in images of the training dataset. However, this annotation of the classification training dataset can be prohibitively expensive and/or time consuming. Further, contemporary attempts to train models using image data with partially labeled classes (e.g., only labeling two of three classes, etc.) has generally lead to significant model quality degradation.

SUMMARY

Aspects and advantages of embodiments of the present disclosure will be set forth in part in the following description, or can be learned from the description, or can be learned through practice of the embodiments.

One example aspect of the present disclosure is directed to a computing system for training a multi-class object classification model with partially labeled training data. The computing system can include one or more processors. The computing system can include a machine-learned multi-class object classification model configured to classify a plurality of object classes. The computing system can include one or more tangible, non-transitory computer readable media storing computer-readable instructions that when executed by the one or more processors cause the one or more processors to perform operations. The operations can include obtaining image data depicting one or more objects and ground truth data comprising a subset of object class annotations respectively associated with a subset of object classes of the plurality of object classes. The operations can include processing the image data with the machine-learned multi-class object classification model to obtain object classification data. The operations can include evaluating a loss function that evaluates a multi-class classification loss comprising a difference between the object classification data and the subset of object class annotations, wherein the loss function comprises a plurality of weighted loss signals respectively associated with the plurality of object classes, wherein the weight of each of the weighted loss signals is based at least in part on the inclusion of the object class associated with the respective loss signal within the subset of object classes. The operations can include adjusting one or more parameters of the machine-learned multi-class object classification model based at least in part on the loss function.

Another example aspect of the present disclosure is directed to a computer-implemented method for training a machine-learned multi-class object classification model with partially labeled training data. The method can include obtaining, by a computing system comprising one or more computing devices, image data depicting one or more objects and ground truth data comprising a subset of object class annotations respectively associated with a subset of object classes of a plurality of object classes. The method can include processing, by the computing system, the image data with the machine-learned multi-class object classification model to obtain object classification data. The method can include evaluating, by the computing system, a loss function that evaluates a multi-class classification loss comprising a difference between the object classification data and the subset of object class annotations, wherein the loss function comprises a plurality of weighted loss signals respectively associated with the plurality of object classes, wherein the weight of each of the weighted loss signals is based at least in part on the inclusion of the object class associated with the respective loss signal within the subset of object classes. The method can include adjusting, by the computing system, one or more parameters of the machine-learned multi-class object classification model based at least in part on the loss function.

Another example aspect of the present disclosure is directed to one or more tangible, non-transitory computer readable media storing computer-readable instructions that when executed by one or more processors cause the one or more processors to perform operations. The operations can include obtaining image data depicting one or more objects and ground truth data comprising a subset of object class annotations respectively associated with a subset of object classes of a plurality of object classes. The operations can include processing the image data with a machine-learned multi-class object classification model to obtain object classification data, wherein the machine-learned multi-class object classification model is configured to classify each of the one or more objects as belonging to an object class of the plurality of object classes. The operations can include modifying a loss function to obtain a modified loss function, wherein the loss function comprises a plurality of loss signals respectively associated with the plurality of object classes, wherein the modified loss function comprises a subset of the plurality of loss signals respectively associated with the subset of object classes. The operations can include evaluating the modified loss function, wherein the modified loss function evaluates a multi-class classification loss comprising a difference between the object classification data and the subset of object class annotations. The operations can include adjusting one or more parameters of the machine-learned multi-class object classification model based at least in part on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
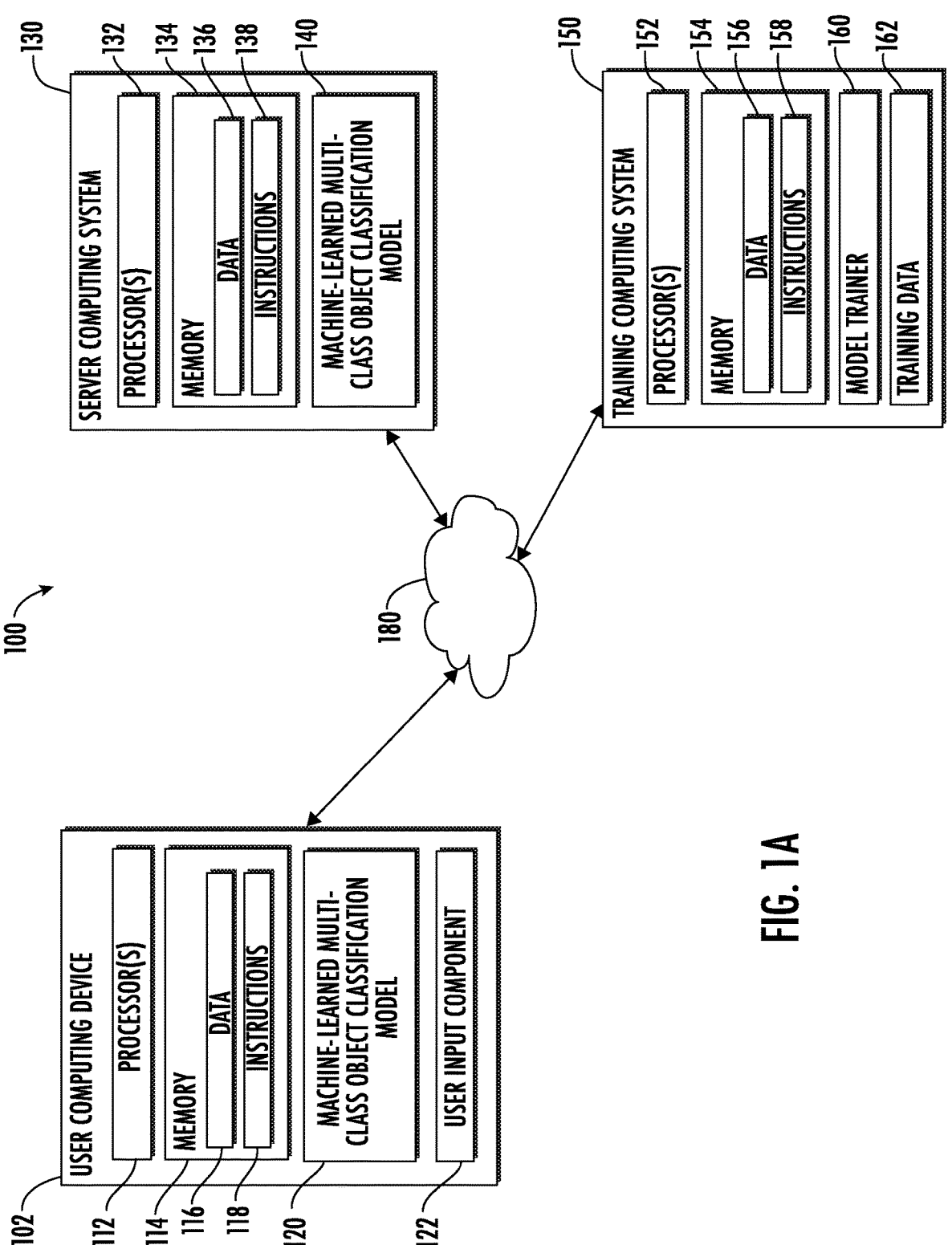
FIG. 1A depicts a block diagram of an example computing system that performs machine-learned multi-class object classification according to example embodiments of the present disclosure.

Reference numerals that are repeated across plural figures are intended to identify the same features in various implementations.

DETAILED DESCRIPTION

Overview

Generally, the present disclosure is directed to training machine-learned multi-class object classification models using partially labeled training data. More particularly, the present disclosure relates to training machine-learned multi-class object classification models to recognize multiple classes of objects depicted in image data using partially labeled training data. As an example, a machine-learned multi-class object classification model can be configured to classify objects depicted in image data as belonging to a plurality of classes (e.g., a bear class, a lion class, a tiger class, a kangaroo class, etc.). Image data that depicts one or more objects can be obtained alongside ground truth data that includes a subset of object class annotations (e.g., ground truth class labels) associated with a subset of the plurality of object classes (e.g., two of four total classes, etc.). The image data can be processed with the machine-learned multi-class object classification model to obtain object classification data that classifies the object(s) depicted in the image data.

A loss function can be evaluated that evaluates a multi-class classification loss including a difference between the object classification data and the subset of object class annotations (e.g., a difference between an object classification and an associated label, etc.). More particularly, the loss function can include a plurality of weighted loss signals respectively associated with the plurality of object classes (e.g., a weighted bear loss signal for a bear class, a weighted lion loss signal for a lion class, etc.). The weight of each of the weighted loss signals can be based at least in part on the inclusion of the object class of the loss signal within the subset of object classes. For example, a weighted loss signal for a class from the plurality of object classes (e.g., a kangaroo class) that is not included in the subset of object classes (e.g., bear, lion, and tiger classes) can have a lower weight than a weighted loss signal for an object class (e.g., the bear class) that is included in the subset of object classes.

Parameter(s) of the multi-class object classification model can be adjusted based at least in part on the loss function (e.g., proportionally to the weights of the weighted loss signals). In such fashion, the machine-learned multi-class object classification model can be trained to recognize labeled classes without degrading model performance in regards to unlabeled classes. More particularly, by adjusting the relevance of or eliminating a loss signal for a class that is not labeled in the training data (e.g., not included in the subset of classes), the model can be trained such that an unlabeled region of a training image is treated with a less negative or neutral assumption as to the presence of an unlabeled class. By removing or reducing the impact of this assumption, the model can be trained with partially labeled training data without leading to model quality degradation for classification of unlabeled classes.

More particularly, image data that depicts one or more objects can be obtained alongside ground truth data. The ground truth data can include a subset of object class annotations (e.g., ground truth labels) that are respectively associated with a subset of object classes from a plurality of object classes. As an example, the image data can be or otherwise include one or more images (e.g., an image, a plurality of video frames, etc.) from a training dataset that is configured to be used to train a machine-learned classification model to recognize and classify a plurality of classes. The image from the training dataset can include four objects belonging to four separate classes. The subset of object class annotations can be or otherwise include annotations for the first two classes of the four separate classes. As another example, the ground truth data for a second image of the training dataset can include object class annotations for the remaining two classes of the four separate classes. In such fashion, the subset of class annotations included in the ground truth data can, in some implementations, include different classes from the plurality of classes for different images included in a training dataset.

In some implementations, the object class annotations can include a bounding box that defines a region of the image data and an associated class label. As an example, the image data may depict a lion object. The object class annotation can include a bounding box that defines the region of the image data that includes the lion and a corresponding "lion" label. Alternatively, or additionally, in some implementations, the object class annotation can label the entire image of the image data as including or not including a class. As an example, the image data may not depict a tiger. The object class annotation can indicate that a tiger is not depicted in the image data.

In some implementations, the image data can be a portion of image data from an image. As an example, the image data can be a portion of image data extracted from an image based on a prediction that the portion of image data depicts an object (e.g., extracted by a region proposal network (RPN), etc.). As another example, the image data can be a portion of image data that is not defined by a bounding box of an object class annotation. Alternatively, in some implementations, the image data can be or otherwise include the entirety of the depiction of the image data. As an example, the image data can be obtained and can subsequently be processed iteratively by the machine-learned multi-class object classification model to recognize regions that are predicted to include an object and subsequently or concurrently classify the object.

The image data can be processed with the machine-learned multi-class object classification model to obtain object classification data. The machine-learned multi-class object classification model can be or otherwise include any sort of conventional machine-learned object classification model. As an example, the machine-learned model can be or can otherwise include one or more neural networks (e.g., deep neural networks, recurrent neural networks, graph neural networks, etc.) or the like. Neural networks (e.g., deep neural networks) can be feed-forward neural networks, convolutional neural networks, and/or various other types of neural networks.

The machine-learned multi-class object classification model can be configured to classify a plurality of object classes. More particularly, the machine-learned multi-class object classification model can be configured to process image data to classify an object depicted in the image data as belonging to a class from the plurality of classes. Additionally, or alternatively, in some implementations the machine-learned multi-class object classification model can be a portion (e.g., a component of a model, one or more layers of a model, etc.) of a machine-learned image analysis model that performs both object recognition and object classification. As an example, the machine-learned multi-class object classification model may be an object classification portion of a conventional two-stage object detector model (e.g., Faster-RCNN, etc.). For example, a first stage of the two-stage object detector model (e.g., a region proposal network (RPN), etc.) may obtain the image data and output a region of the image data (e.g., a region not defined by a bounding box, etc.) predicted to contain an object (e.g., using an anchoring-based approach, etc.). The region of the image data can be processed with the machine-learned multi-class object classification model to obtain the object classification data.

As another example, the machine-learned multi-class object classification model can be or otherwise be incorporated in a one-stage object detector model (e.g., a 1-stage single shot detector model, etc.) For example, the machine-learned multi-class object classification model can be or otherwise include a plurality of machine-learned layers (e.g., convolutional layer(s), activation layer(s), etc.) that predict region(s) that may include a predicted object that can subsequently be processed with additional classification layers of the multi-class object classification model to generate the object classification data. For another example, the machine-learned multi-class object classification model can include a plurality of layers that predict a region of the image data to include a predicted object and simultaneously classify the predicted object. In such fashion, the method of training the machine-learned multi-class object classification model can be applied to any conventional machine-learned image analysis model (e.g., a single shot detector (SSD) model, a you-only-look-once (YOLO) model, a Faster-RCNN model, etc.).

The object classification data output by the machine-learned multi-class object classification model can provide a multi-class classification output for an object depicted in the image data. As an example, a portion of the image may depict a bear object. The machine-learned multi-class object classification model can be configured to classify an object as belonging to one of four classes (e.g., a bear, a tiger, a kangaroo, a lion, etc.). The object classification data may include a plurality of predicted object class annotations indicative of whether an object belongs to each of the classes (e.g., bear 1, tiger 0, kangaroo 0, lion 0, etc.). Alternatively, in some implementations, the object classification data may include a plurality of object class probability predictions that the object depicted in the image data belongs to each of the four classes (e.g., 80% bear, 15% tiger, 15% kangaroo, 10% lion, etc.). In some implementations, the object classification data may include a single indication that the object depicted in the image data belongs to a class. As an example, the object classification data may be or otherwise include a predicted class annotation (e.g., a "bear" class annotation, etc.). As such, the object classification data can include a plurality of predictive probability outputs for a respective plurality of classes and/or a predicted class annotation for an object depicted in the image data or a portion of the image data. The object classification data output by the machine-learned multi-class object classification model will be discussed in greater detail with regards to FIGS. 4 and 5.

A loss function can be evaluated that evaluates a multi-class classification loss. The multi-class classification loss can include a difference between the object classification data and the subset of object class annotations (e.g., a difference between a predicted object class annotation and a ground truth object class annotation, etc.). More particularly, the loss function can include a plurality of weighted loss signals that are respectively associated with the plurality of object classes (e.g., a bear weighted loss signal for a bear class, a lion weighted loss signal for a lion, etc.). The weight of each of the weighted loss signals can be based at least in part on the inclusion of the object class associated with the respective loss signal within the subset of object classes.

As an example, a first weighted loss signal can be associated with a first class from the plurality of object classes that is not included in the subset of object classes. For example, the first class can be a kangaroo class and the subset of object classes can include a bear class, a lion class, and a tiger class. Since the first class is not included in the subset of classes, the weight of the first loss signal can be weighted as to reduce the impact of the first loss signal relative to the loss function. In some implementations, the weights of each of the weighted loss signals can be a normalized value. For example, the weight of the first loss signal can be a weight of 0 while the weight of a second loss signal associated with a class included in the subset of classes can be weighted 1 (e.g., to eliminate the loss signal from the loss function, etc.). For another example, the weight of the first loss signal can be a weight of 0.35 while the weight of a second loss signal associated with a class included in the subset of classes can be weighted 1 (e.g., to reduce the relevance of the first loss signal with respect to the second loss signal, etc.). In such fashion, the weights of the weighted loss signals can be configured to reduce or eliminate the impact of the respective loss signals that are not associated with classes included in the subset of classes (e.g., classes with associated object class annotations (labels), etc.).

One or more parameters of the machine-learned multi-class object classification model can be adjusted based at least in part on the loss function. More particularly, the parameter(s) of the machine-learned multi-class object classification model can be adjusted based on each of the weighted loss signals and their respective weights. In some implementations, the parameter(s) of the machine-learned multi-class object classification model can be adjusted proportionally to the weights of each of the weighted loss signals of the loss function. As an example, the loss function can be utilized to calculate a final loss value based on an evaluation of the difference between the object classification data and the ground truth data. The final loss value can be based proportionally on the weights of the respective weighted loss signals. For example, a weighted loss signal with a weight of zero may contribute nothing to calculation of the final loss value. The loss value can be back propagated through the machine-learned multi-class classification model, and one or more parameters of the model can be adjusted based on the final loss value (e.g., using a gradient descent algorithm, etc.). In such fashion, the adjustments to parameter(s) of the model can be proportional to the weights of the weighted loss signals, therefore reducing the impact of loss signals associated with unlabeled classes during training of the model.

In some implementations, evaluating the loss function can include evaluating a subset of weighted loss signals of the loss function that are respectively associated with the subset of object classes. More particularly, the loss function can include only the weighted loss signals that are associated with the object classes that are labeled (e.g., the subset of object class annotations of the ground truth data, etc.). In such fashion, the loss function can exclude any loss signal associated with an object class that is not annotated by the subset of object class annotations (e.g., is not labeled in the training data, etc.).

In some implementations, the machine-learned multi-class object classification model can be utilized after training. More particularly, the computing system can obtain additional image data depicting one or more additional objects. The image data can be processed using the machine-learned multi-class object classification model to obtain an image classification output. In some implementations, the image classification output can include one or more labels descriptive of the additional image data. As an example, the image classification output may include one or more object class annotations for the one or more additional objects. As another example, the image classification output may include one or more image annotations that annotate the entire image as belonging to one or more classes. For example, the machine-learned multi-class object classification model may label the one or more additional objects as being semantically related to a "nature" image (e.g., a rabbit object, a tree object, a boulder object, a grass object, etc.). Based on the object classification label(s), the image classification data may label the image as belonging to a "nature" image It should be noted that the machine-learned multi-class object classification model can be utilized to detect the presence of specific classes of objects depicted in image data. More particularly, the machine-learned multi-class object classification model can be utilized for object detection by detecting an object that corresponds to a learned class of objects. As an example, the machine-learned object classification model can detect a bear object depicted in image data. As such, the machine-learned multi-class object classification model of the present embodiments can be a machine-learned object detection model and/or can be a component of a machine-learned object detection model.

The present disclosure provides a number of technical effects and benefits. As one example technical effect and benefit, the systems and methods of the present disclosure allow for the training of machine-learned models using partially labeled training data. As described previously, the process of labeling training data for a plurality of classes is an arduous task that is often considered prohibitively expensive in terms of both time and cost. Further, previous attempts to train machine-learned models using partially labeled training data has historically led to significant degradation in model performance. However, under the proposed approach, partially labeled training data can be utilized to train machine-learned models while suffering from little or no degradation in model performance. In turn, this advancement significantly reduces the computational, monetary, and manpower costs associated with labeling training data for machine-learned models. Additionally, this advancement allows for the repurposing of previously labeled training data for use in training multi-class object classification models.

With reference now to the Figures, example embodiments of the present disclosure will be discussed in further detail.

Example Devices and Systems

FIG. 1A depicts a block diagram of an example computing system 100 that performs machine-learned multi-class object classification according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned multi-class object classification models 120. For example, the machine-learned multi-class object classification models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned multi-class object classification models 120 are discussed with reference to FIGS. 2-5.

In some implementations, the one or more machine-learned multi-class object classification models 120 can be received from the server computing system 130 over network 180, stored in the user computing device memory 114, and then used or otherwise implemented by the one or more processors 112. In some implementations, the user computing device 102 can implement multiple parallel instances of a single machine-learned multi-class object classification model 120 (e.g., to perform parallel multi-class object classification across multiple instances of the machine-learned multi-class object classification model).

The machine-learned multi-class object classification model 120 can be configured to classify a plurality of objects. More particularly, the machine-learned multi-class object classification model 120 can be utilized to classify one or more objects depicted in image data as each belonging to one of a plurality of classes. As an example, the user computing device 102 can obtain additional image data (e.g., via network 180, data 116, etc.) depicting one or more additional objects. The image data can be processed using the machine-learned multi-class object classification model 120 to obtain an image classification output. In some implementations, the image classification output can include one or more labels descriptive of the additional image data. As an example, the image classification output may include a one or more object class annotations for the one or more additional objects. As another example, the image classification output may include one or more image annotations that annotate the entire image as belonging to one or more classes. For example, the machine-learned multi-class object classification model 120 may label the one or more additional objects as being semantically related to a "nature" image (e.g., a rabbit object, a tree object, a boulder object, a grass object, etc.). Based on the object classification label(s), the image classification data may label the image as belonging to a "nature" image class.

Additionally or alternatively, one or more machine-learned multi-class object classification models 140 can be included in or otherwise stored and implemented by the server computing system 130 that communicates with the user computing device 102 according to a client-server relationship. For example, the machine-learned multi-class object classification models 140 can be implemented by the server computing system 140 as a portion of a web service (e.g., a multi-class object classification service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof As described above, the server computing system 130 can store or otherwise include one or more machine-learned multi-class object classification models 140. For example, the machine-learned multi-class object classification models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-5.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, image data that depicts one or more objects can be obtained alongside ground truth data. The ground truth data can include a subset of object class annotations that are respectively associated with a subset of object classes from a plurality of object classes. As an example, the image data can be or otherwise include one or more images (e.g., an image, a plurality of video frames, etc.) from a training dataset that is configured to be used to train a machine-learned classification model to recognize and classify a plurality of classes. The image from the training dataset can include four objects belonging to four separate classes. The subset of object class annotations can be or otherwise include annotations for the first two classes of the four separate classes. As another example, the ground truth data for a second image of the training dataset can include object class annotations for the remaining two classes of the four separate classes. In such fashion, the ground truth data can, in some implementations, include different class annotations for different images included in a training dataset.

In some implementations, the object class annotations can include a bounding box that defines a region of the image data and an associated class label. As an example, the image data may depict a lion object. The object class annotation can include a bounding box that defines the region of the image data that includes the lion and a corresponding "lion" label. Alternatively, or additionally, in some implementations, the object class annotation can label the entire image of the image data as including or not including a class. As an example, the image data may not depict a tiger. The object class label can indicate that a tiger is not depicted in the image data.

In some implementations, the image data can be a portion of image data from an image. As an example, the image data can be a portion of image data extracted from an image based on a prediction that the portion of image data depicts an object (e.g., extracted by a region proposal network (RPN), etc.). As another example, the image data can be a portion of image data already defined by a bounding box of an object class annotation. Alternatively, in some implementations, the image data can be or otherwise include an entire image. As an example, the image can be obtained and can subsequently be processed iteratively by the machine-learned multi-class object classification model to recognize regions that are predicted to include an object and subsequently or concurrently classify the object.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The method of training of machine-learned models using partially labeled training data of the present embodiments can be utilized for a variety of machine-learned models, tasks, applications, and/or use cases.

In some implementations, the training data used to train the machine-learned model(s) of the present disclosure can be partially labeled image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the training data used to train the machine-learned model(s) of the present disclosure can be partially labeled text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the training data used to train the machine-learned model(s) of the present disclosure can be partially labeled speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the training data used to train the machine-learned model(s) of the present disclosure can be partially labeled latent encoding data. The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be or otherwise include an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the training data can include partially labeled visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the training data can include partially labeled audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
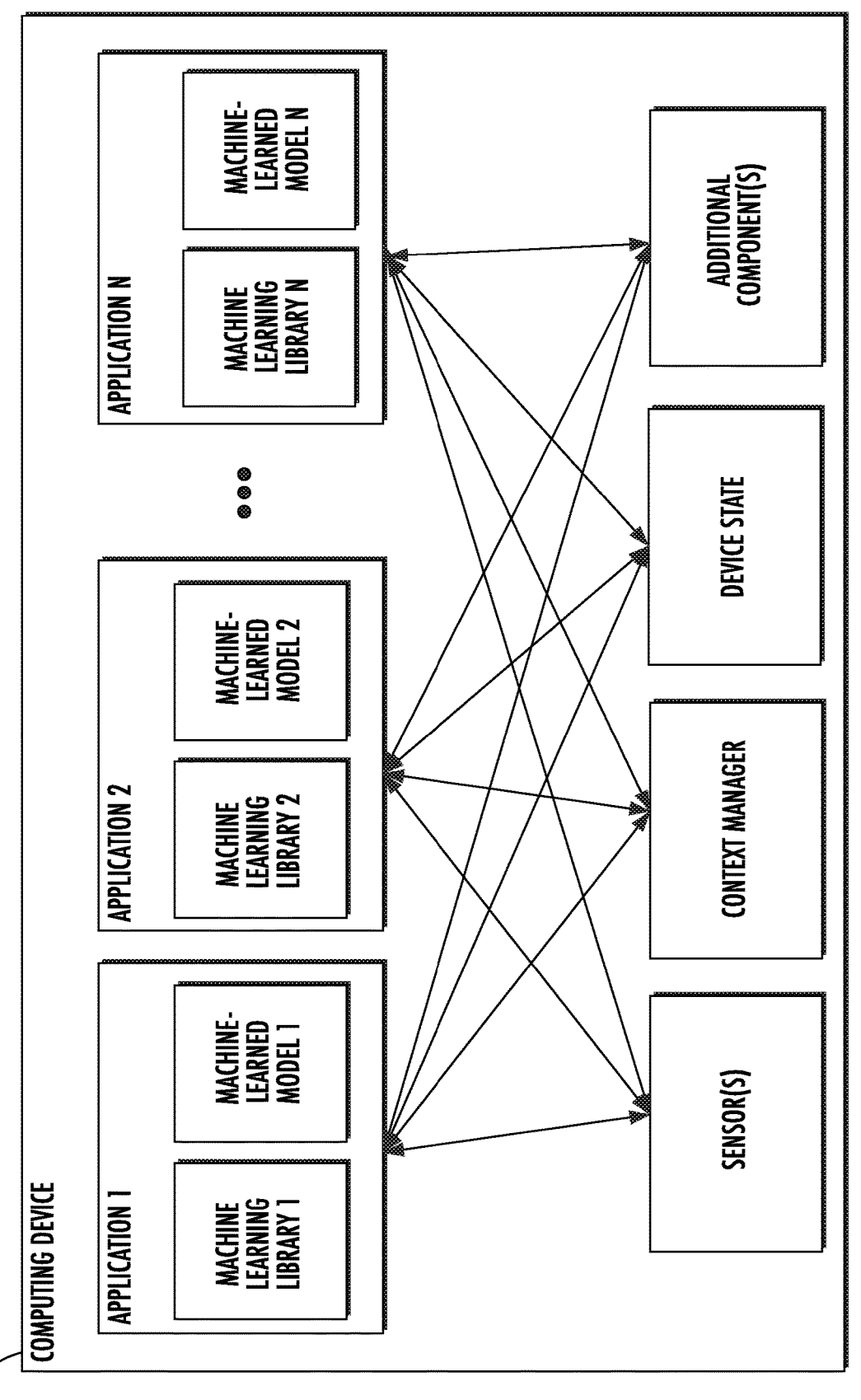
FIG. 1B depicts a block diagram of an example computing device that performs training of a machine-learned multi-class object classification model according to example embodiments of the present disclosure.

FIG. 1B depicts a block diagram of an example computing device 10 that performs training of a machine-learned multi-class object classification model according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
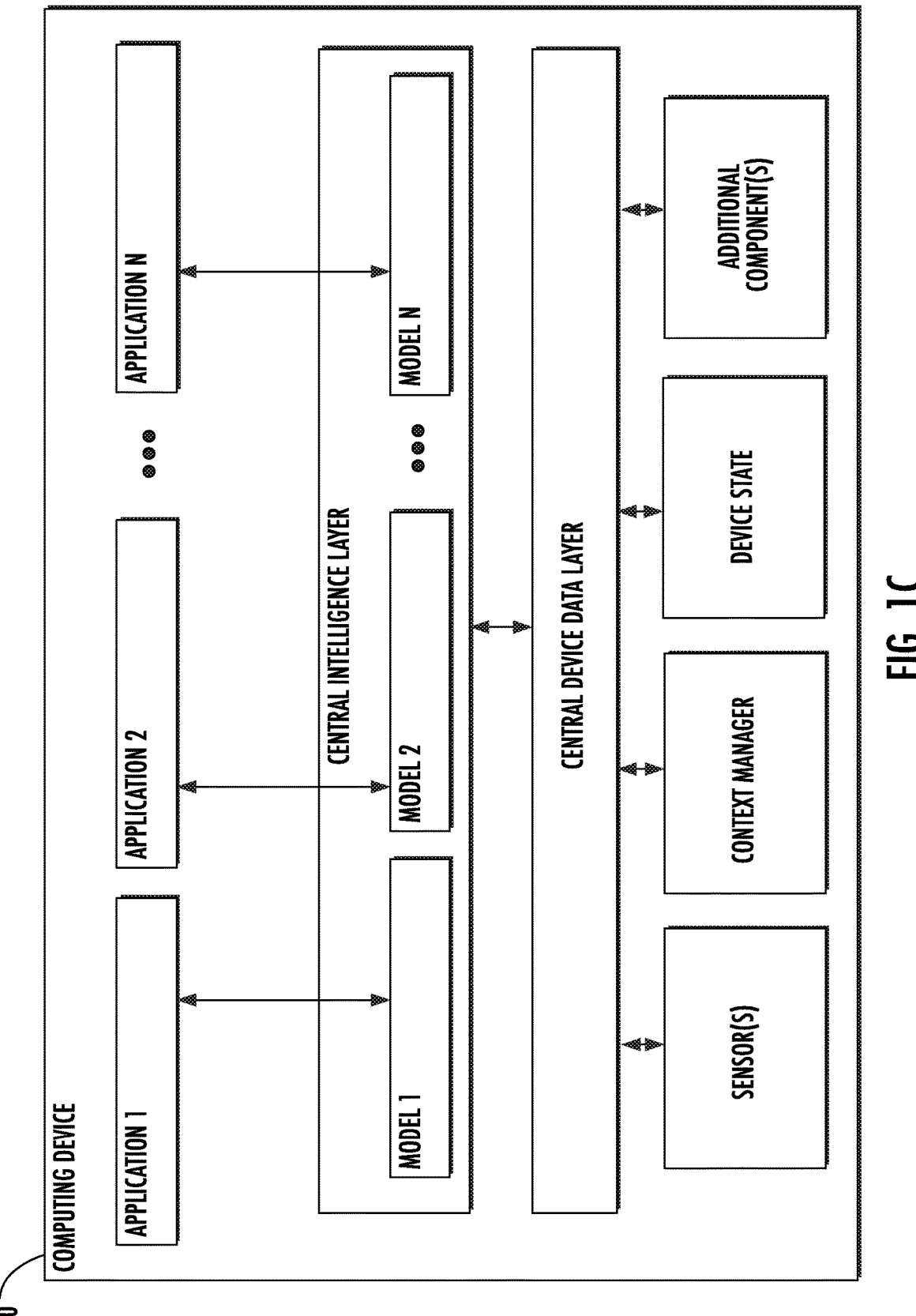
FIG. 1C depicts a block diagram of an example computing device that performs machine-learned multi-class object classification according to example embodiments of the present disclosure.

FIG. 1C depicts a block diagram of an example computing device 50 that performs machine-learned multi-class object classification according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figures 2, 3:
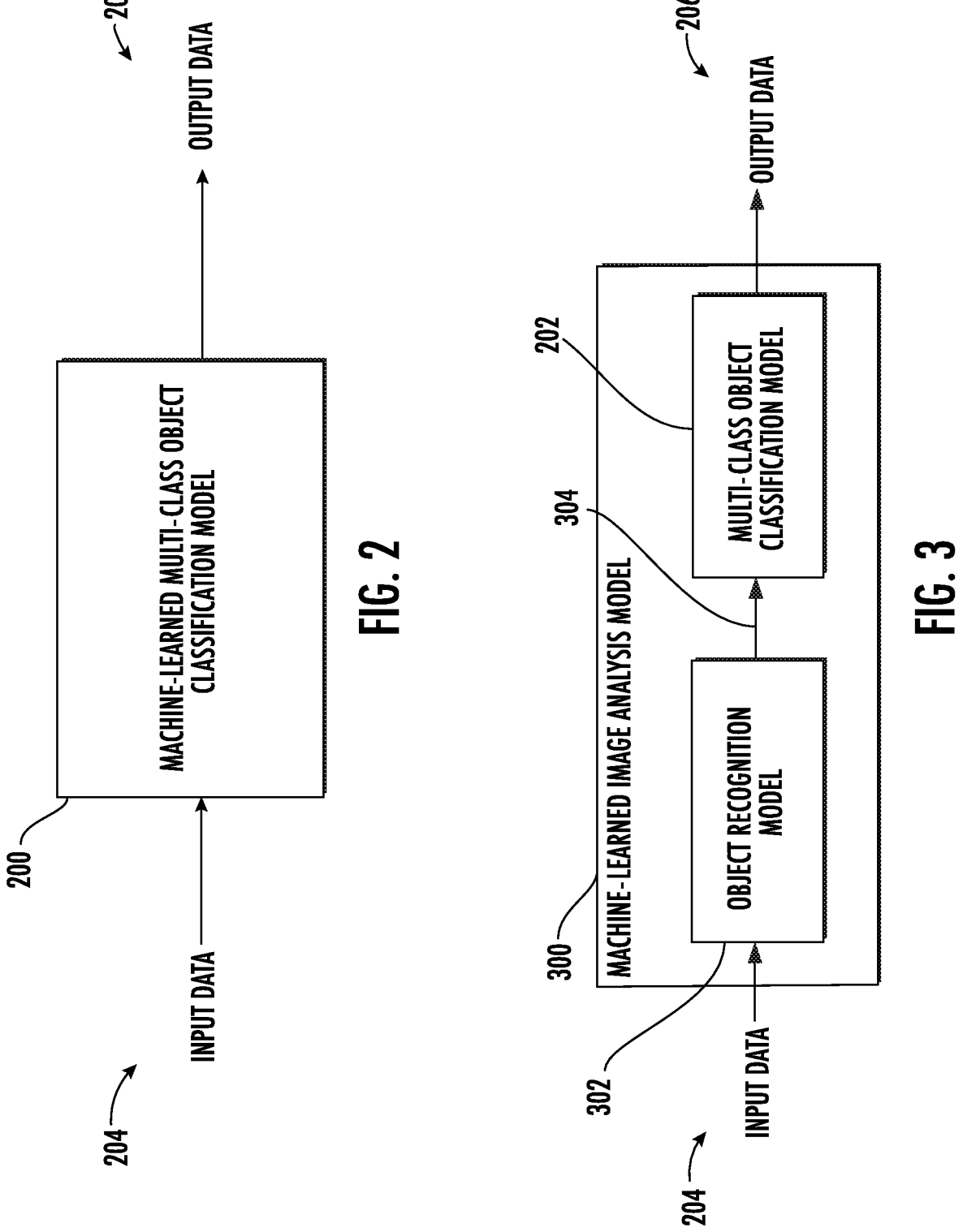
FIG. 2 depicts a block diagram of an example machine-learned multi-class object classification model according to example embodiments of the present disclosure.
FIG. 3 depicts a block diagram of an example machine-learned image analysis model according to example embodiments of the present disclosure.

FIG. 2 depicts a block diagram of an example machine-learned multi-class object classification model 200 according to example embodiments of the present disclosure. In some implementations, the machine-learned multi-class object classification model 200 is trained to receive a set of input data 204 descriptive of an image and, as a result of receipt of the input data 204, provide output data 206 that classifies one or more objects depicted in the image.

More particularly, the machine-learned multi-class object classification model 200 can be configured to classify a plurality of object classes. The machine-learned multi-class object classification model 200 can obtain input data 204 that includes image data depicting one or more objects. The machine-learned multi-class object classification model 200 can process the image data to obtain output data 206. The output data 206 can include object classification data that classifies the one or more objects as belonging to one or more respective object classes. As an example, the output data 204 may include one or more object class annotations for the one or more objects depicted in the input data 204. As another example, the output data 204 may include one or more image annotations that annotate the entire image depicted by the input data 204 as belonging to one or more classes. For example, the machine-learned multi-class object classification model 200 may label the one or more additional objects as being semantically related to a "nature" image (e.g., a rabbit object, a tree object, a boulder object, a grass object, etc.). Based on the object classification label(s), the image classification data may label the image depicted by the image data 204 as belonging to a "nature" image class.

FIG. 3 depicts a block diagram of an example machine-learned image analysis model 300 according to example embodiments of the present disclosure. The machine-learned image analysis model 300 is similar to machine-learned multi-class object classification model 200 of FIG. 2 except that machine-learned image analysis model 300 further includes a machine-learned object recognition model 302. The machine-learned object recognition model 302 can be operable to predict the presence of one or more objects in a portion of the input data 204.

More particularly, the machine-learned multi-class object classification model 304 may be included as an object classification portion of the machine-learned image analysis model 300 (e.g., a conventional two-stage object detector model, etc.). Additionally, the machine-learned object recognition model 302 can be included as an object recognition portion of the machine-learned image analysis model 300. For example, the machine-learned object recognition model 302 (e.g., a region proposal network (RPN), etc.) may obtain the input data 204 that includes image data and output a portion of the image data 304 (e.g., defined as a bounding box) predicted to contain an object (e.g., using an anchoring-based approach, etc.). The portion of the image data 304 can be processed with the machine-learned multi-class object classification model 202 to obtain the output data 206 that includes the object classification data.

Figure 4:
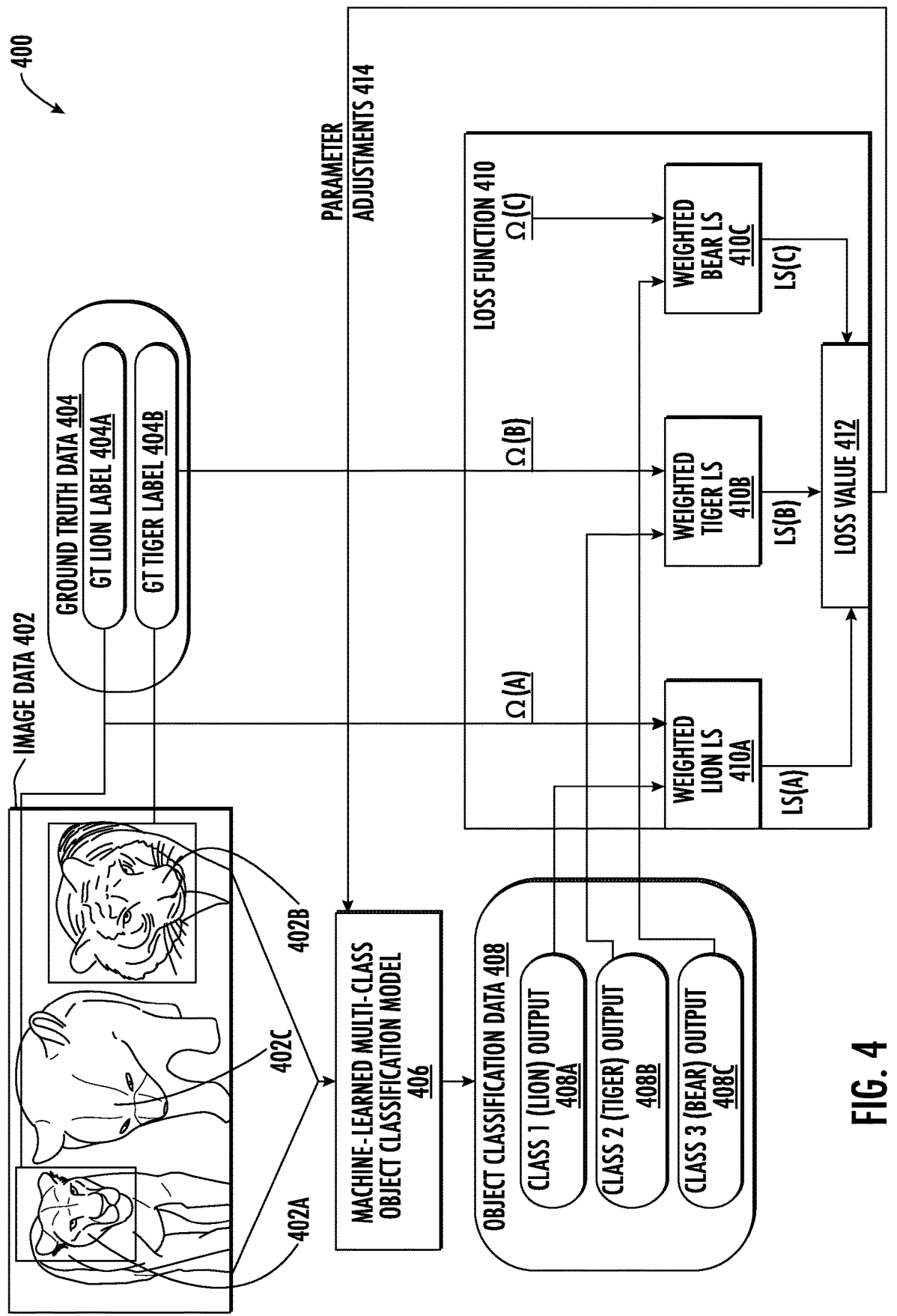
FIG. 4 depicts a data flow diagram of a method for training a machine-learned multi-class object classification model using partially labeled training data according to example embodiments of the present disclosure.

FIG. 4 depicts a data flow diagram of a method 400 for training a machine-learned multi-class object classification model using partially labeled training data according to example embodiments of the present disclosure. Image data 402 (e.g., partially labeled training data, etc.) can be obtained that depicts three objects 402A-402C that are each classified as belonging to a respective object class from a plurality of object classes. As depicted, the example objects 402A-402C can respectively belong to a lion object class (e.g., 402A), a tiger object class (e.g., 402B), and a bear object class (e.g., 402C). Ground truth data 404 can be obtained alongside the image data 402 that includes a subset of object class annotations 404A/404B that are respectively associated with a subset of object classes from a plurality of object classes. More particularly, the ground truth data 404 can include a ground truth lion class label 404A (e.g., object class annotation) for the object 402A and a ground truth tiger label 404B (e.g., object class annotation) for the tiger object 402B, but can lack a corresponding object class annotation for the bear object 402C (e.g., a label for the region of the image that the bear is depicted in).

As depicted, the object class annotations 404A-404B can be or otherwise include a bounding box that defines a region of the image data 402 and an associated class label (e.g., 404A/404B). Alternatively, or additionally, in some implementations, the ground truth data 404 can include object class annotation(s) that label the entire image depicted in the image data 402 as including or not including an object of a particular object class. As an example, a ground truth kangaroo label of the ground truth data 404 may indicate that the image data 402 does or does not depict a kangaroo.

In some implementations, the machine-learned multi-class object classification model 406 can process the image data 402. Alternatively, in some implementations, the machine-learned multi-class object classification model 406 can process a portion of the image data 402 predicted to include an object. For example, the image data can be the portion of the image data 402 that includes the bear class object 402C (e.g., the portion of the image data 402 that is not defined by a bounding box associated with labels 404A-404B, etc.). The image data 402 can be processed to obtain object classification data 408. The object classification data 408 output by the machine-learned multi-class object classification model 406 can include a multi-class classification output 408A-408C for the object(s) (e.g., 402A-402C) that the machine-learned multi-class object classification model is configured to classify.

The object classification data 408 can include class output 408A-408C for each of the classes that the machine-learned multi-class object classification model 406 is configured to classify (e.g., a lion class, a tiger class, a bear class, etc.). As an example, each of the class outputs 408A-408C can include a prediction as to whether the object depicted in the image data 402 belongs to a respective class. For example, class 1 output 408A may indicate that the object belongs to the lion class 402A and class outputs 408B/408C can indicate that the object does not belong to their respective classes 402B/402C. As another example, each of the class outputs 408A-408C can indicate probability that the object depicted in the image data (or the portion of the image data) belongs to each of the four classes. For example, class 1 output 408A can indicate a 15% probability that the depicted object is a tiger, while class 2 output 408B and class 3 output 408C can indicate other probabilities that the object is a certain class.

The loss function 410 can be evaluated that evaluates a difference between the object classification data 408 and the subset of object class annotations of the ground truth data 404 (e.g., a difference between a predicted object class annotation 408A-408C and a ground truth object class annotation 408A-408B, etc.). More particularly, the loss function 410 can include a plurality of weighted loss signals 410A-410C that are respectively associated with the plurality of object classes 402A-402C (e.g., a weighted lion loss signal 410A for a lion class 402A, a weighted tiger loss signal 410B for a tiger class 402B, a weighted bear loss signal 410C for a bear class 402C, etc.). The weight of each of the weighted loss signals 410A-410C can be based at least in part on the inclusion of the object class 402A-402C associated with the respective loss signal 410A-410C within the subset of object classes 402A-402C.

The weighted lion loss signal 410A and the weighted tiger loss signal 410B are respectively associated with classes

402A and 402B that are included in the subset of classes 402A/402B of the plurality of classes 402A-402C (e.g., labeled in the ground truth data 402 with object class annotations 404A/404B). The weighted bear loss signal 410C is associated with a class 402C that is not included in the subset of classes 402A/402B of the plurality of classes 402A-402C (e.g., not labeled in the ground truth data 402 with a corresponding object class annotation). As there is no object class annotation in the ground truth data 404 for the class 402C, an accuracy (e.g., a loss) of class output 408C for the bear class 402C cannot necessarily be evaluated properly. As such, due to the unknown classification accuracy of output 408C, the corresponding weight of the weighted bear loss signal 410C can be lower relative to the weights of loss signals for which labels are provided (e.g., 410A and 410B), therefore reducing the overall impact of the weighted bear loss signal 410C on the final loss value 412.

The final loss value 412 can be determined based at least in part on the weighted loss signals 410A, 410B, and 410C. In some implementations, a weighted loss signal for a class that is not included in the subset of classes (e.g., a weighted loss signal for a class without a corresponding object class annotation) can be weighted such that the loss signal is excluded from determination of the final loss value 412. As an example, the weight of the weighted loss signal 410C can be a weight of zero, and the final loss value 412 can be based on each weighted loss signal with a weight above zero (e.g., 410A and 410B). In some implementations, the weights of each of the weighted loss signals can be a normalized value. For example, the weight of the weighted bear loss signal 410C can be a weight of 0.35 while the weight of weighted lion and tiger loss signals 410A/410B can each be weighted 1 (e.g., to reduce the relevance of the weighted bear loss signal 410C to the calculation of the final loss value, etc.). The final loss value 412 can be determined based on the respective weights of each of the loss signals 410A-410C.

One or more parameter adjustments 414 can be generated based at least in part on the loss function 410 and/or the final loss value 412, and can be applied to the machine-learned multi-class object classification model (e.g., using a gradient descent algorithm, etc.). In such fashion, a penalty to the machine-learned multi-class object classification model derived from loss value 412 can be reduced for a model output corresponding to a class without a corresponding class annotation, therefore facilitating the training of the machine-learned multi-class object classification model 406 with image data 402 that is only partially labeled (e.g., image data that includes objects without a corresponding label, etc.).

Example Methods

Figure 5:
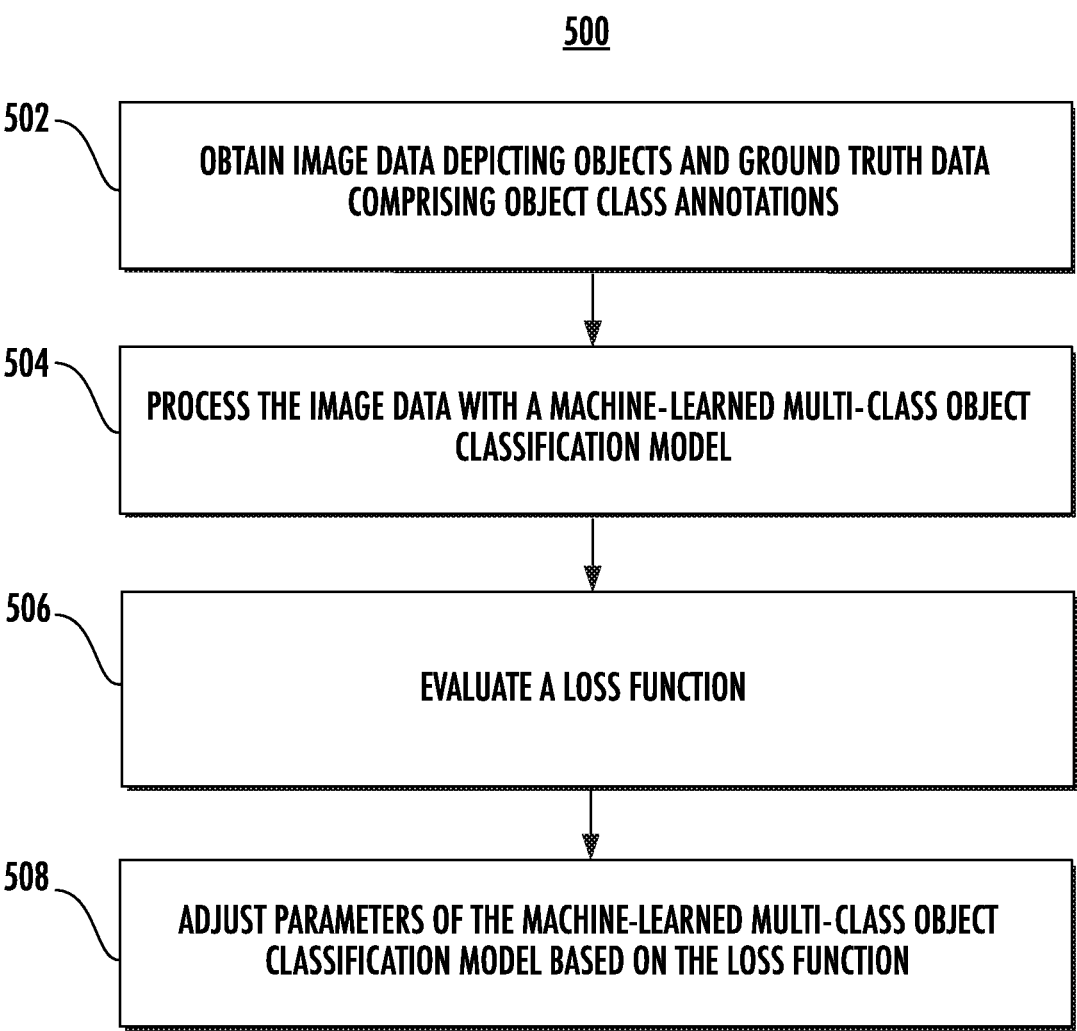
FIG. 5 depicts a flow chart diagram of an example method 500 to perform training of a machine-learned multi-class object classification model with partially labeled training data.

FIG. 5 depicts a flow chart diagram of an example method 500 to perform training of a machine-learned multi-class object classification model with partially labeled training data according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain image data depicting objects and ground truth data including object class annotations. More particularly, image data can be obtained by the computing system that depicts one or more objects can be obtained alongside ground truth data. The ground truth data can include a subset of object class annotations (e.g., ground truth labels) that are respectively associated with a subset of object classes from a plurality of object classes. As an example, the image data can be or otherwise include one or more images (e.g., an image, a plurality of video frames, etc.) from a training dataset that is configured to be used to train a machine-learned classification model to recognize and classify a plurality of classes. The image from the training dataset can include four objects belonging to four separate classes. The subset of object class annotations can be or otherwise include annotations for the first two classes of the four separate classes. As another example, the ground truth data for a second image of the training dataset can include object class annotations for the remaining two classes of the four separate classes. In such fashion, the subset of class annotations included in the ground truth data can, in some implementations, include different classes from the plurality of classes for different images included in a training dataset.

In some implementations, the object class annotations can include a bounding box that defines a region of the image data and an associated class label. As an example, the image data may depict a lion object. The object class annotation can include a bounding box that defines the region of the image data that includes the lion and a corresponding "lion" label. Alternatively, or additionally, in some implementations, the object class annotation can label the entire image of the image data as including or not including a class. As an example, the image data may not depict a tiger. The object class annotation can indicate that a tiger is not depicted in the image data.

In some implementations, the image data can be a portion of image data from an image. As an example, the image data can be a portion of image data extracted from an image based on a prediction that the portion of image data depicts an object (e.g., extracted by a region proposal network (RPN), etc.). As another example, the image data can be a portion of image data that is not defined by a bounding box of an object class annotation. Alternatively, in some implementations, the image data can be or otherwise include the entirety of the depiction of the image data. As an example, the image data can be obtained and can subsequently be processed iteratively by the machine-learned multi-class object classification model to recognize regions that are predicted to include an object and subsequently or concurrently classify the object.

At 504, the computing system can process the image data with a machine-learned multi-class object classification model. More particularly, the computing system can process the image data with the machine-learned multi-class object classification model to obtain object classification data. The machine-learned multi-class object classification model can be or otherwise include any sort of conventional machine-learned object classification model. As an example, the machine-learned model can be or can otherwise include one or more neural networks (e.g., deep neural networks, recurrent neural networks, graph neural networks, etc.) or the like. Neural networks (e.g., deep neural networks) can be feed-forward neural networks, convolutional neural networks, and/or various other types of neural networks.

The machine-learned multi-class object classification model can be configured to classify a plurality of object classes. More particularly, the machine-learned multi-class object classification model can be configured to process image data to classify an object depicted in the image data as belonging to a class from the plurality of classes. Additionally, or alternatively, in some implementations the machine-learned multi-class object classification model can be a portion (e.g., a component of a model, one or more layers of a model, etc.) of a machine-learned image analysis model that performs both object recognition and object classification. As an example, the machine-learned multi-class object classification model may be an object classification portion of a conventional two-stage object detector model (e.g., Faster-RCNN, etc.). For example, a first stage of the two-stage object detector model (e.g., a region proposal network (RPN), etc.) may obtain the image data and output a region of the image data (e.g., a region not defined by a bounding box, etc.) predicted to contain an object (e.g., using an anchoring-based approach, etc.). The region of the image data can be processed with the machine-learned multi-class object classification model to obtain the object classification data.

As another example, the machine-learned multi-class object classification model can be or otherwise be incorporated in a one-stage object detector model (e.g., a 1-stage single shot detector model, etc.) For example, the machine-learned multi-class object classification model can be or otherwise include a plurality of machine-learned layers (e.g., convolutional layer(s), activation layer(s), etc.) that predict region(s) that may include a predicted object that can subsequently be processed with additional classification layers of the multi-class object classification model to generate the object classification data. For another example, the machine-learned multi-class object classification model can include a plurality of layers that predict a region of the image data to include a predicted object and simultaneously classify the predicted object. In such fashion, the method of training the machine-learned multi-class object classification model can be applied to any conventional machine-learned image analysis model (e.g., a single shot detector (SSD) model, a you-only-look-once (YOLO) model, a Faster-RCNN model, etc.).

The object classification data output by the machine-learned multi-class object classification model can provide a multi-class classification output for an object depicted in the image data. As an example, a portion of the image may depict a bear object. The machine-learned multi-class object classification model can be configured to classify an object as belonging to one of four classes (e.g., a bear, a tiger, a kangaroo, a lion, etc.). The object classification data may include a plurality of predicted object class annotations indicative of whether an object belongs to each of the classes (e.g., bear 1, tiger 0, kangaroo 0, lion 0, etc.). Alternatively, in some implementations, the object classification data may include a plurality of object class probability predictions that the object depicted in the image data belongs to each of the four classes (e.g., 80% bear, 15% tiger, 15% kangaroo, 10% lion, etc.). In some implementations, the object classification data may include a single indication that the object depicted in the image data belongs to a class. As an example, the object classification data may be or otherwise include a predicted class annotation (e.g., a "bear" class annotation, etc.). As such, the object classification data can include a plurality of predictive probability outputs for a respective plurality of classes and/or a predicted class annotation for an object depicted in the image data or a portion of the image data.

At 506, the computing system can evaluate a loss function. More particularly, the computing system can evaluate a loss function that evaluates a multi-class classification loss. The multi-class classification loss can include a difference between the object classification data and the subset of object class annotations (e.g., a difference between a predicted object class annotation and a ground truth object class annotation, etc.). More particularly, the loss function can include a plurality of weighted loss signals that are respectively associated with the plurality of object classes (e.g., a bear weighted loss signal for a bear class, a lion weighted loss signal for a lion, etc.). The weight of each of the weighted loss signals can be based at least in part on the inclusion of the object class associated with the respective loss signal within the subset of object classes.

As an example, a first weighted loss signal can be associated with a first class from the plurality of object classes that is not included in the subset of object classes. For example, the first class can be a kangaroo class and the subset of object classes can include a bear class, a lion class, and a tiger class. Since the first class is not included in the subset of classes, the weight of the first loss signal can be weighted as to reduce the impact of the first loss signal relative to the loss function. In some implementations, the weights of each of the weighted loss signals can be a normalized value. For example, the weight of the first loss signal can be a weight of 0 while the weight of a second loss signal associated with a class included in the subset of classes can be weighted 1 (e.g., to eliminate the loss signal from the loss function, etc.). For another example, the weight of the first loss signal can be a weight of 0.35 while the weight of a second loss signal associated with a class included in the subset of classes can be weighted 1 (e.g., to reduce the relevance of the first loss signal with respect to the second loss signal, etc.). In such fashion, the weights of the weighted loss signals can be configured to reduce or eliminate the impact of the respective loss signals that are not associated with classes included in the subset of classes (e.g., classes with associated object class annotations (labels), etc.).

At 508, the computing system can adjust parameters of the machine-learned multi-class object classification model. More particularly, the computing system can adjust one or more parameters of the machine-learned multi-class object classification model based at least in part on the loss function. More particularly, the parameter(s) of the machine-learned multi-class object classification model can be adjusted based on each of the weighted loss signals and their respective weights. In some implementations, the parameter(s) of the machine-learned multi-class object classification model can be adjusted proportionally to the weights of each of the weighted loss signals of the loss function. As an example, the loss function can be utilized to calculate a final loss value based on an evaluation of the difference between the object classification data and the ground truth data. The final loss value can be based proportionally on the weights of the respective weighted loss signals. For example, a weighted loss signal with a weight of zero may contribute nothing to calculation of the final loss value. The loss value can be back propagated through the machine-learned multi-class classification model, and one or more parameters of the model can be adjusted based on the final loss value (e.g., using a gradient descent algorithm, etc.). In such fashion, the adjustments to parameter(s) of the model can be proportional to the weights of the weighted loss signals, therefore reducing the impact of loss signals associated with unlabeled classes during training of the model.

In some implementations, evaluating the loss function can include evaluating a subset of weighted loss signals of the loss function that are respectively associated with the subset of object classes. More particularly, the loss function can include only the weighted loss signals that are associated with the object classes that are labeled (e.g., the subset of object class annotations of the ground truth data, etc.). In such fashion, the loss function can exclude any loss signal associated with an object class that is not annotated by the subset of object class annotations (e.g., is not labeled in the training data, etc.).

In some implementations, the machine-learned multi-class object classification model can be utilized after training. More particularly, the computing system can obtain additional image data depicting one or more additional objects. The image data can be processed using the machine-learned multi-class object classification model to obtain an image classification output. In some implementations, the image classification output can include one or more labels descriptive of the additional image data. As an example, the image classification output may include one or more object class annotations for the one or more additional objects. As another example, the image classification output may include one or more image annotations that annotate the entire image as belonging to one or more classes. For example, the machine-learned multi-class object classification model may label the one or more additional objects as being semantically related to a "nature" image (e.g., a rabbit object, a tree object, a boulder object, a grass object, etc.). Based on the object classification label(s), the image classification data may label the image as belonging to a "nature" image

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for training a multi-class object classification model with partially labeled training data, comprising:
   one or more processors;
   a machine-learned multi-class object classification model configured to classify a plurality of object classes; and
   one or more tangible, non-transitory computer readable media storing computer-readable instructions that when executed by the one or more processors cause the one or more processors to perform operations, the operations comprising:

obtaining image data depicting one or more objects and ground truth data comprising a subset of object class annotations respectively associated with a subset of object classes of the plurality of object classes;

processing the image data with the machine-learned multi-class object classification model to obtain object classification data;

evaluating a loss function that evaluates a multi-class classification loss comprising a difference between the object classification data and the subset of object class annotations, wherein the loss function comprises a plurality of weighted loss signals respectively associated with the plurality of object classes, wherein the weight of each of the weighted loss signals has a magnitude greater than zero and is based at least in part on the inclusion of the object class associated with the respective loss signal within the subset of object classes; and adjusting one or more parameters of the machine-learned multi-class object classification model based at least in part on the loss function.

2. The computing system of claim 1, wherein:

the weight of each of the weighted loss signals is a normalized value;

a first weighted loss signal of the plurality of weighted loss signals is associated with a first object class that is included within the subset of object classes;

a second weighted loss signal of the plurality of weighted loss signals is associated with a second object class that is excluded from the subset of object classes; and the weight of the first weighted loss signal is greater than the weight of the second weighted loss signal.

3. The computing system of claim 1, wherein the one or more parameters of the machine-learned multi-class object classification model are adjusted proportionally to the weights of each of the weighted loss signals of the loss function.

4. The computing system of claim 1, wherein:

a first annotation of the subset of object class annotations comprises a bounding box and a label for a corresponding object of a first object class depicted in the image data; and a second annotation of the subset of object class annotations comprises a label indicating that an object of a second object class is not depicted in the image data.

5. The computing system of claim 1, wherein the object classification data comprises one or more predicted object class annotations for one or more objects predicted to be depicted in the image data.

6. The computing system of claim 1, wherein evaluating the loss function comprises evaluating a subset of weighted loss signals of the loss function respectively associated with the subset of object classes.

7. The computing system of claim 1, wherein the operations further comprise:

obtaining additional image data depicting one or more additional objects; and processing the additional image data with the machine-learned multi-class classification model to obtain an image classification output, the image classification output comprising one or more labels descriptive of the additional image data.

8. A computer-implemented method for training a machine-learned multi-class object classification model with partially labeled training data, comprising:

obtaining, by a computing system comprising one or more computing devices, image data depicting one or more objects and ground truth data comprising a subset of object class annotations respectively associated with a subset of object classes of a plurality of object classes;

processing, by the computing system, the image data with the machine-learned multi-class object classification model to obtain object classification data;

evaluating, by the computing system, a loss function that evaluates a multi-class classification loss comprising a difference between the object classification data and the subset of object class annotations, wherein the loss function comprises a plurality of weighted loss signals respectively associated with the plurality of object classes, wherein the weight of each of the weighted loss signals has a magnitude greater than zero and is based at least in part on the inclusion of the object class associated with the respective loss signal within the subset of object classes; and adjusting, by the computing system, one or more parameters of the machine-learned multi-class object classification model based at least in part on the loss function.

9. The computer-implemented method of claim 8, wherein:

the weight of each of the weighted loss signals is a normalized value;

a first weighted loss signal of the plurality of weighted loss signals is associated with a first object class that is included within the subset of object classes;

a second weighted loss signal of the plurality of weighted loss signals is associated with a second object class that is excluded from the subset of object classes; and the weight of the first weighted loss signal is greater than the weight of the second weighted loss signal.

10. The computer-implemented method of claim 8, wherein the one or more parameters of the machine-learned multi-class object classification model are adjusted proportionally to the weights of each of the weighted loss signals of the loss function.

11. The computer-implemented method of claim 8, wherein:

a first annotation of the subset of object class annotations comprises a bounding box and a label for a corresponding object of a first object class depicted in the image data; and a second annotation of the subset of object class annotations comprises a label indicating that an object of a second object class is not depicted in the image data.

12. The computer-implemented method of claim 8, wherein the object classification data comprises one or more predicted object class annotations for one or more objects predicted to be depicted in the image data.

13. The computer-implemented method of claim 8, wherein evaluating the loss function comprises evaluating, by the computing system, a subset of weighted loss signals of the loss function respectively associated with the subset of object classes.

14. The computer-implemented method of claim 8, wherein the method further comprises:

obtaining, by the computing system, additional image data depicting one or more additional objects; and processing, by the computing system, the additional image data with the machine-learned multi-class object classification model to obtain an image classification output, the image classification output comprising one or more labels descriptive of the additional image data.

\* \* \* \* \*